United States Patent
Wu et al.

(10) Patent No.: US 8,414,815 B2
(45) Date of Patent: Apr. 9, 2013

(54) SEAMLESS FUSER MEMBER PROCESS

(75) Inventors: Jin Wu, Pittsford, NY (US); Jonathan H. Herko, Walworth, NY (US); Francisco J. Lopez, Rochester, NY (US); Kyle B. Tallman, Farmington, NY (US); Dante M. Pietrantoni, Rochester, NY (US); Michael S. Roetker, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 302 days.

(21) Appl. No.: 12/868,362

(22) Filed: Aug. 25, 2010

(65) Prior Publication Data

US 2012/0049400 A1 Mar. 1, 2012

(51) Int. Cl.
*B28B 1/02* (2006.01)
*F16G 1/00* (2006.01)
*B32B 27/00* (2006.01)

(52) U.S. Cl. ........ 264/310; 264/129; 264/311; 264/312; 156/137; 428/473.5

(58) Field of Classification Search ................ 264/129, 264/310, 311, 312; 156/137; 428/473.5
See application file for complete search history.

(56) References Cited

U.S. PATENT DOCUMENTS

| | | | |
|---|---|---|---|
| 3,565,847 A | 2/1971 | Dileone | |
| 3,778,417 A | 12/1973 | Serres, Jr. et al. | |
| 5,665,802 A | 9/1997 | Maki et al. | |
| 5,918,099 A | 6/1999 | Schlueter, Jr. et al. | |
| 6,625,416 B1 | 9/2003 | Badesha et al. | |
| 6,911,240 B2 | 6/2005 | Kondoh | |
| 6,939,652 B2 | 9/2005 | Yu | |
| 7,424,256 B2 * | 9/2008 | Natori et al. | 399/302 |
| 7,542,713 B2 * | 6/2009 | Yoshida | 399/346 |
| 7,702,256 B2 * | 4/2010 | Nukada et al. | 399/159 |
| 7,706,733 B2 | 4/2010 | Pearce et al. | |
| 2003/0049057 A1 | 3/2003 | Finn et al. | |
| 2004/0058147 A1 | 3/2004 | Ozawa et al. | |
| 2005/0145832 A1 | 7/2005 | Wessling et al. | |
| 2006/0013616 A1 * | 1/2006 | Nukada et al. | 399/167 |
| 2008/0020313 A1 | 1/2008 | Wu et al. | |
| 2008/0096118 A1 * | 4/2008 | Mera et al. | 430/109.4 |
| 2008/0145564 A1 | 6/2008 | Allam et al. | |
| 2008/0308962 A1 * | 12/2008 | Natori et al. | 264/114 |
| 2009/0142093 A1 * | 6/2009 | Sawada et al. | 399/111 |
| 2009/0142094 A1 * | 6/2009 | Sawada et al. | 399/111 |

(Continued)

FOREIGN PATENT DOCUMENTS

| | | |
|---|---|---|
| DE | 4115832 A1 | 11/1992 |
| GB | 2166370 A * | 5/1986 |

(Continued)

OTHER PUBLICATIONS

U.S. Appl. No. 12/868,324, filed Aug. 25, 2010, Office Action dated Oct. 11, 2011.

(Continued)

*Primary Examiner* — Christina Johnson
*Assistant Examiner* — Atul P Khare
(74) *Attorney, Agent, or Firm* — Hoffman Warnick LLC

(57) ABSTRACT

Described herein is a method forming a belt suitable for use with an image forming system. The method includes coating a composition of a polyimide, a phosphate ester and a solvent onto an outer surface of a rotating metal belt, and subsequently curing and releasing the composition from the metal belt.

12 Claims, 1 Drawing Sheet

U.S. PATENT DOCUMENTS

2009/0324959 A1* 12/2009 Wu ................................ 428/421
2011/0024024 A1* 2/2011 Pietrantoni et al. ........... 156/137
2011/0105658 A1 5/2011 Wu

FOREIGN PATENT DOCUMENTS

| JP | 62157110 A | * | 7/1987 |
| JP | 2002079527 A | * | 3/2002 |
| JP | 2002284898 A | * | 10/2002 |
| JP | 2006256098 A | * | 9/2006 |
| JP | 2007229944 A | * | 9/2007 |

OTHER PUBLICATIONS

German Patent Application 10 2011 080 646.6, Search Report dated May 10, 2012.

U.S. Appl. No. 12/868,324, filed Aug. 25, 2010, Office Action dated Apr. 17, 2012.

* cited by examiner

SEAMLESS FUSER MEMBER PROCESS

CROSS REFERENCE TO RELATED APPLICATIONS

This application relates to commonly assigned copending application Ser. No. 12/868,324, FUSER MEMBER, filed simultaneously herewith and incorporated by reference herein.

BACKGROUND

1. Field of Use

This disclosure is directed to a fuser member and a method of manufacture.

2. Background

Centrifugal molding is used to obtain seamless polyimide belts useful as fuser members. Typically, a thin fluorine or silicone release layer is applied to the inner surface of a rigid cylindrical mandrel. A polyimide coating is applied to the inner surface of the mandrel containing the release layer. The polyimide is cured and then released the mandrel.

There are drawbacks to this process. The length of the polyimide belt is determined by the size of the mandrel. The requirement of a release layer on the inner surface of the mandrel is an additional process step.

SUMMARY

Described herein is a method forming a belt suitable for use with an image forming system. The method includes flow coating a composition of a polyimide, a phosphate ester and a solvent onto an outer surface of a rotating substrate. The coating is partially cured at a temperature of from about 125° C. to about 190° C. for a time of from about 30 to about 90 minutes to form a belt. The partially cured belt is removed from the rotating substrate. The partially cured belt is tensioned and rotated at a temperature of from about 250° C. to about 370° C. for a time of from about 30 to about 90 minutes to cure the belt.

Described herein is a method of forming a belt suitable for use with an image forming system. The method comprises flow coating a composition of a polyimide, a phosphate ester and a solvent onto an outer surface of a rotating substrate. The coating is cured at a temperature of from about 125° C. to about 190° C. for a time of from about 30 to about 90 minutes, and then at a temperature of from about 250° C. to about 370° C. for a time of from about 30 to about 90 minutes to form a belt. The fully cured belt is removed from the rotating substrate.

Described herein is a method of forming a fuser member. The method comprises flow coating a composition of a polyimide, a phosphate ester, a polysiloxane polymer and a solvent onto an outer surface of a rotating substrate. The coating is partially cured at a temperature of from about 125° C. to about 190° C. for a time of from about 30 to about 90 minutes to form a belt. The partially cured belt is removed from the rotating substrate. The partially cured belt is tensioned and rotated at a temperature of from about 250° C. to about 370° C. for a time of from about 30 to about 90 minutes to cure the belt. An intermediate layer is coated on an outer layer of the cured belt; and a release layer is coated on the intermediate layer.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
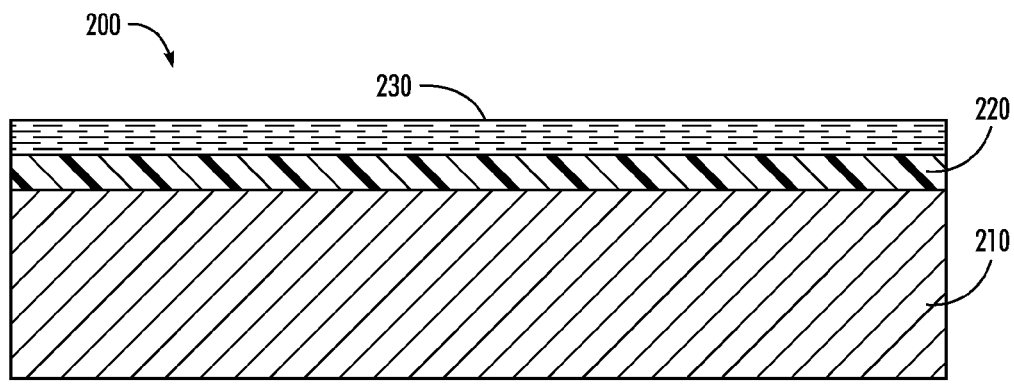
FIG. 1 depicts an exemplary fusing member having a belt substrate in accordance with the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

The fuser or fixing member can include a substrate having one or more functional intermediate layers formed thereon. The substrate described herein includes a belt. The one or more intermediate layers include cushioning layers and release layers. Such fixing member can be used as an oil-less fusing member for high speed, high quality electrophotographic printing to ensure and maintain a good toner release from the fused toner image on an image supporting material (e.g., a paper sheet), and further assist paper stripping.

In various embodiments, the fixing member can include, for example, a substrate, with one or more functional layers formed thereon. The substrate can be formed in various shapes, such as a belt, or a film, using suitable materials that are non-conductive or conductive depending on a specific configuration, for example, as shown in FIG. 1.

In FIG. 1, the exemplary fixing member 200 can include a belt substrate 210 with one or more functional intermediate layers, e.g., 220 and an outer surface layer 230 formed thereon. The outer surface layer 230 is also referred to as a release layer. The belt substrate 210 is described further and is made of a polyimide polymer and a phosphate ester.

Intermediate Layer

Examples of materials used for the functional intermediate layer 220 (also referred to as cushioning layer or intermediate layer) include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC®735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional intermediate layers provide elasticity and can be mixed with inorganic particles, for example SiC or $Al_2O_3$, as required.

Other examples of the materials suitable for use as functional intermediate layer 220 also include fluoroelastomers. Fluoroelastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and cure site monomer. These fluoroelastomers are known commercially under various designations such as VITON A® VITON B® VITON E® VITON E 60C®, VITON E430®, VITON 910®, VITON GH®; VITON GF®; and VITON ETP®. The VITON® designation is a Trademark of E.I. DuPont de Nemours, Inc. The cure site monomer can be 4-bromoperfluorobutene-1, 1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the Tecnoflons identified as FOR-60KIR®, FOR-LHF® NM® FOR-THF®, FOR-TFS® TH® NH®, P757® TNS®, T439 PL958® BR9151® and TN505®, available from Ausimont.

Examples of three known fluoroelastomers are (1) a class of copolymers of two of vinylidenefluoride, hexafluoropropylene, and tetrafluoroethylene, such as those known commercially as VITON A®; (2) a class of terpolymers of vinylidenefluoride, hexafluoropropylene, and tetrafluoroethylene known commercially as VITON B®; and (3) a class of tetrapolymers of vinylidenefluoride, hexafluoropropylene, tetrafluoroethylene, and cure site monomer known commercially as VITON GH® or VITON GF®.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

The thickness of the functional intermediate 220 layer is from about 30 microns to about 1,000 microns, or from about 100 microns to about 800 microns, or from about 150 to about 500 microns.

Release Layer

An exemplary embodiment of a release layer includes fluoropolymer particles. Fluoropolymer particles suitable for use in the formulation described herein include fluorine-containing polymers. These polymers include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. The fluoropolymer particles provide chemical and thermal stability and have a low surface energy. The fluoropolymer particles have a melting temperature of from about 255° C. to about 360° C. or from about 280° C. to about 330° C. These particles are melted to form the release layer 230.

For the fuser member 200, the outer surface layer or release layer 230 can be from about 10 microns to about 100 microns, or from about 20 microns to about 80 microns, or from about 40 microns to about 60 microns.

Adhesive Layer

Optionally, any known and available suitable adhesive layer may be positioned between the release layer 230, the functional intermediate layer 220 and the substrate 210. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 2 nanometers to about 2,000 nanometers, or from about 2 nanometers to about 500 nanometers. The adhesive can be coated by any suitable known technique, including spray coating or wiping.

Substrate Layer

The polyimide composition suitable for use as a substrate layer 210 of FIG. 1 is described below. The polyimide composition includes an internal release agent that self releases from a metal substrate such as stainless steel. Most references report applying an external release layer on the metal substrate before coating the polyimide layer, and then releasing it. The composition is cost effective since only one coating layer is needed.

The composition comprises a polyamic acid and an internal release agent comprising a phosphate ester. Less than one weight percent of the internal release agent is needed to fully release the polyimide layer from the stainless steel. In embodiments, the internal release agent is present in an amount of from less than about 0.5 weight percent. In embodiments, the internal release agent is present in an amount of from less than about 0.1 weight percent. The polyimide and the phosphate ester of the substrate composition are present in a weight ratio of about 99.9/0.1 to about 95/5.

The composition comprises a polyamic acid and an internal release agent comprising a phosphate ester. Less than 4 weight percent of the internal release agent is needed to fully release the polyimide layer from the stainless steel. In embodiments, the internal release agent is present in an amount of from less than about 1 weight percent. In embodiments, the internal release agent is present in an amount of from less than about 0.1 weight percent.

The disclosed polyamic acid includes one of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and the like and mixtures thereof.

Commercial examples of polyamic acid of pyromellitic dianhydride/4,4-oxydianiline include PYRE-ML RC5019 (about 15-16 weight percent in N-methyl-2-pyrrolidone, NMP), RC5057 (about 14.5-15.5 weight percent in NMP/aromatic hydrocarbon=80/20), and RC5083 (about 18-19 weight percent in NMP/DMAc=15/85), all from Industrial Summit technology Corp., Parlin, N.J.; DURIMIDE® 100, commercially available from FUJIFILM Electronic Materials U.S.A., Inc.

Commercial examples of polyamic acid of biphenyl tetracarboxylic dianhydride/4,4'-oxydianiline include U-VARNISH A, and S (about 20 weight in NMP), both from UBE America Inc., New York, N.Y.

Commercial examples of polyamic acid of biphenyl tetracarboxylic dianhydride/phenylenediamine include PI-2610 (about 10.5 weight in NMP), and PI-2611 (about 13.5 weight in NMP), both from HD MicroSystems, Parlin, N.J.

Commercial examples of polyamic acid of benzophenone tetracarboxylic dianhydride/4,4'-oxydianiline include RP46, and RP50 (about 18 weight percent in NMP), both from Unitech Corp., Hampton, Va.

Commercial examples of polyamic acid of benzophenone tetracarboxylic dianhydride/4,4'-oxydianiline/phenylenediamine include PI-2525 (about 25 weight percent in NMP), PI-2574 (about 25 weight percent in NMP), PI-2555 (about 19 weight percent in NMP/aromatic hydrocarbon=80/20), and PI-2556 (about 15 weight percent in NMP/aromatic hydrocarbon/propylene glycol methyl ether=70/15/15), all from HD MicroSystems, Parlin, N.J.

Various amounts of polyamic acid can be selected for the substrate, such as for example, from about 90 to about 99.9 weight percent, from 95 to about 99.8 weight percent, or from 97 to about 99.5 weight percent.

Other polyamic acid or ester of polyamic acid examples that can be included in the intermediate transfer member are from the reaction of a dianhydride and a diamine. Suitable dianhydrides include aromatic dianhydrides and aromatic tetracarboxylic acid dianhydrides such as, for example, 9,9-bis (trifluoromethyl)xanthene-2,3,6,7-tetracarboxylic acid dianhydride, 2,2-bis(3,4-dicarboxyphenyl)hexafluoropropane dianhydride, 2,2-bis((3,4-dicarboxyphenoxy)phenyl) hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)ether dianhydride, di-(4-(3,4-dicarboxyphenoxy)phenyl) sulfide dianhydride, di-(3,4-dicarboxyphenyl)methane dianhydride, di-(3,4-dicarboxyphenyl)ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis (3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride, 4,4'-(m-phenylenedioxy) diphthalic dianhydride, 4,4'-diphenylsulfidedioxybis(4-phthalic acid)dianhydride, 4,4'-diphenylsulfonedioxybis(4-phthalic acid)dianhydride, methylenebis(4-phenyleneoxy-4-phthalic acid)dianhydride, ethylidenebis(4-phenyleneoxy-4-phthalic acid)dianhydride, isopropylidenebis-(4-phenyleneoxy-4-phthalic acid)dianhydride, hexafluoroisopropylidenebis(4-phenyleneoxy-4-phthalic acid)dianhydride, and the like. Exemplary diamines suitable for use in the preparation of the polyamic acid include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2, 2',3,3',5,5',6,6'-octafluoro-biphenyl, 4,4'-diamino-2,2',3,3',5, 5',6,6'-octafluorodiphenyl ether, bis[4-(3-aminophenoxy)-phenyl]sulfide, bis[4-(3-aminophenoxy)phenyl]sulfone, bis [4-(3-aminophenoxy)phenyl]ketone, 4,4'-bis(3-aminophenoxy)biphenyl, 2,2-bis[4-(3-aminophenoxy) phenyl]-propane, 2,2-bis[4-(3-aminophenoxy)phenyl]-1,1,1, 3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, and 2,2-di(p-aminophenyl)-1,1,1,3,3,3-hexafluoropropane, and the like and mixtures thereof.

The dianhydrides and diamines are, for example, selected in a weight ratio of dianhydride to diamine of from about 20:80 to about 80:20, and more specifically, in an about 50:50 weight ratio. The above aromatic dianhydride like aromatic tetracarboxylic acid dianhydrides and diamines like aromatic diamines are used singly or as a mixture, respectively.

Examples of phosphate esters selected as an internal release agent with a polyamic acid, such as a polyamic acid of pyromellitic dianhydride/4,4-oxydianiline, include a number of known phosphate esters, and more specifically, where the phosphate ester is a phosphate ester of alkyl alcohol alkoxylate such as alkyl alcohol ethoxylate, alkyl phenol alkoxylate such as alkyl phenol ethoxylate, alkyl polyethoxyethanol such as alkyl polyalkoxyethanol, alkylphenoxy polyalkoxyethanol such as alkylphenoxy polyethoxyethanol, mixtures thereof, and corresponding alkoxy esters wherein alkyl and alkoxy contain, for example, from 1 to about 36 carbon atoms, from 1 to about 18 carbon atoms, from 1 to about 12 carbon atoms, from 1 to about 6 carbon atoms, optionally mixtures thereof, and the like.

Examples of phosphate esters of alkyl alcohol ethoxylate include POLYSTEP® P-11, P-12 and P-13 (tridecyl alcohol ethoxylate phosphate, available from STEPAN Company, Northfield, Ill.) with an average mole number of ethoxy (EO) of about 3, 6 and 12, respectively. Examples of phosphate esters of alkyl phenol ethoxylates include POLYSTEP® P-31, P-32, P-33, P-34 and P-35 (nonylphenol ethoxylate phosphate, available from STEPAN Company, Northfield, Ill.) with an average mole number of ethoxy (EO) of about 4, 6, 8, 10 and 12, respectively. Examples of phosphate esters of alkyl polyethoxyethanol include STEPFAC™ 8180, 8181 and 8182 (polyethylene glycol monotridecyl ether phosphate, available from STEPAN Company, Northfield, Ill.) with an average mole number of ethoxy (EO) of about 3, 6 and 12, respectively. Examples of phosphate esters of alkylphenoxy polyethoxyethanol include STEPFAC™ 8170, 8171, 8172, 8173, 8175 (nonylphenol ethoxylate phosphate, available from STEPAN Company, Northfield, Ill.) with an average mole number of ethoxy (EO) of about 10, 6, 4, 8 and 12, respectively, and TSP-PE (tristyrylphenol ethoxylate phosphate, available from STEPAN Company, Northfield, Ill.) with an average mole number of ethoxy (EO) of about 16.

Various amounts of phosphate ester can be selected for the substrate, such as for example, from about 0.1 to about 10 weight percent, from 0.2 to about 5 weight percent, or from 0.5 to about 3 weight percent.

The polyimide substrate composition can optionally contain a polysiloxane copolymer to enhance or smooth the coating. The concentration of the polysiloxane copolymer is less than about 1 weight percent or less than about 0.2 weight percent. The optional polysiloxane copolymer includes a polyester modified polydimethylsiloxane, commercially available from BYK Chemical with the trade name of BYK® 310 (about 25 weight percent in xylene) and 370 (about 25 weight percent in xylene/alkylbenzenes/cyclohexanone/monophenylglycol=75/11/7/7); a polyether modified polydimethylsiloxane, commercially available from BYK Chemical with the trade name of BYK® 330 (about 51 weight percent in methoxypropylacetate) and 344 (about 52.3 weight percent in xylene/isobutanol=80/20), BYK®-SILCLEAN 3710 and 3720 (about 25 weight percent in methoxypropanol); a polyacrylate modified polydimethylsiloxane, commercially available from BYK Chemical with the trade name of BYK®-SILCLEAN 3700 (about 25 weight percent in methoxypropylacetate); or a polyester polyether modified polydimethylsiloxane, commercially available from BYK Chemical with the trade name of BYK® 375 (about 25 weight percent in Di-propylene glycol monomethyl ether). The polyimide, the phosphate ester and the polysiloxane polymer of the substrate are present in a weight ratio of about 99.9/0.09/0.01 to about 95/4/1.

The polyimide substrate composition includes a solvent. Examples of the solvent selected to form the composition include toluene, hexane, cyclohexane, heptane, tetrahydrofuran, methyl ethyl ketone, methyl isobutyl ketone, N,N'-dimethylformamide, N,N'-dimethylacetamide, N-methylpyrrolidone (NMP), methylene chloride and the like and mixtures thereof where the solvent is selected, for example, in an amount of from about 70 weight percent to about 95 weight percent, and from 80 weight percent to about 90 weight percent based on the amounts in the coating mixture.

The polyimide composition is flow coated on the outer surface of a welded stainless steel belt at the desired product circumference. The seam thickness and profile can be minimized, and the surface finish and roughness of the substrate belt can be specified, for example, a rough lathed or honed belt is better for the polyimide layer release. Such a configuration easily allows the production of belts of various lengths and widths. Using a rotating mandrel limits the width and length of the belts able to be produced as each belt requires a separate mandrel.

In one embodiment, the coating belt substrate is a rough lathed belt substrate with a $R_a$ of from about 0.05 micron to about 0.2 micron, or from about 0.1 to about 0.15 micron; and a $R_{max}$ of from 0.75 micron to about 1 micron, or from about 0.8 micron to about 0.9 micron. The back of the polyimide fuser substrate flow coated from this substrate is similarly rough lathed, thus recognizable.

In another embodiment, the coating belt substrate is a honed belt substrate with a $R_a$ of from about 0.15 micron to about 0.35 micron, or from about 0.2 to about 0.3 micron; and a $R_{max}$ of from 2 micron to about 4 micron, or from about 2.5 micron to about 3.5 micron. The back of the polyimide fuser substrate flow coated from this substrate is similarly honed, thus recognizable.

The polyimide layer thickness can be achieved by single pass or multi pass coating. For single pass, the polyimide layer is coated, and pre-cured at a temperature between about 125° C. and about 190° C. for a time of about 30 to about 90 minutes, and then fully cured at a temperature between about 250° C. and about 370° C. for a time of about 30 to about 90 minutes. For multi-pass, such as dual pass, the bottom polyimide layer is coated on a substrate and pre-cured between about 125° C. and about 190° C. for a time of about 30 to about 90 minutes, and the top polyimide layer is subsequently coated and pre-cured between about 125° C. and about 190° C. for a time of about 30 to about 90 minutes, and finally the dual layer is fully cured at a temperature between about 250° C. and about 370° C. for a time of about 30 to about 90 minutes. In an embodiment a stainless steel belt is used as the substrate. The substrate is rotated at a speed of from about 20 rpm to about 100 rpm during the thermal curing of the coating. The polyimide layer stays on the coating substrate all the time during the curing process.

In the other embodiment, for single pass, the polyimide layer is coated, and pre-cured at a temperature between about 125° C. and about 190° C. for a time of about 30 to about 90 minutes. For multi-pass, such as dual pass, the bottom polyimide layer is coated on a substrate and pre-cured between about 125° C. and about 190° C. for a time of about 30 to about 90 minutes, and the top polyimide layer is subsequently coated and pre-cured between about 125° C. and about 190° C. for a time of about 30 to about 90 minutes. In an embodiment a stainless steel belt is used as the substrate. The substrate is rotated at a speed of from about 20 rpm to about 100 rpm during the thermal curing of the coating.

Figure 2:
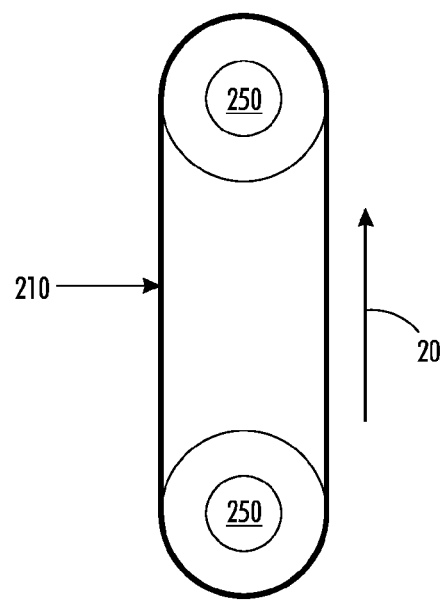
FIG. 2 depicts a tensioning of a fusing member for final curing.

The pre-cured polyimide belt self releases from the stainless steel belt, and then is further completely cured at about 250° C. to about 370° C. for a time of about 30 to about 90 minutes under tension in the configuration shown in FIG. 2. This final curing is at a tension of from about 1 kilogram to about 10 kilograms. As shown in FIG. 2, the pre-cured belt 210 is tensioned between two rollers 250 while rotating the direction of arrow 20. The final curing produces a belt that exhibits a modulus suitable for use as a fuser member.

Additives and additional conductive or non-conductive fillers may be present in the above-described composition or the various layers of the fuser belt. In various embodiments, other filler materials or additives including, for example, inorganic particles, can be used for the coating composition and the subsequently formed surface layer. Conductive fillers used herein include carbon blacks such as carbon black, graphite, fullerene, acetylene black, fluorinated carbon black, and the like; carbon nanotubes, metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof. Certain polymers such as polyanilines, polythiophenes, polyacetylene, poly(p-phenylene vinylene), poly (p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixture thereof can be used as conductive fillers. In various embodiments, other additives known to one of ordinary skill in the art can also be included to form the disclosed composite materials.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Experimentally, a composition (Example 1) of polyamic acid of pyromellitic dianhydride/4,4-oxydianiline/phosphate ester of alkyl phenol ethoxylate/polyester-co-polysiloxane in a weight ratio of 99.3/0.5/0.2 was prepared in NMP, at about 13 weight percent solid, where the polyamic acid of pyromellitic dianhydride/4,4-oxydianiline was commercially available from Industrial Summit Technology Corp., Parlin, N.J. with the trade name of PYRE-ML RC5019 (about 15-16 weight percent in N-methyl-2-pyrrolidone, NMP). The phosphate ester of alkyl phenol ethoxylate was commercially available from Stepan Company, Northfield, Ill. with the trade name of POLYSTEP® P-34 (nonylphenol ethoxylate phosphate with an average mole number of ethoxy of about 10). The polyester-co-polysiloxane was commercially available from BYK Chemical with the trade name of BYK® 310 (about 25 weight percent in xylene). The clear coating solution was flow coated on a stainless steel belt, and subsequently cured at 125° C. for 30 minutes and then at 190° C. for 30 minutes. A 40 µm thick polyimide bottom layer was formed on the stainless steel substrate belt. Subsequently, a second pass polyimide layer was coated on top of the existing polyimide layer, and cured at 125° C. for 30 minutes and then at 190° C. for 30 minutes. The dual pass coating produced an 80 micron polyimide belt.

The pre-cured polyimide belt self released from the stainless steel substrate belt. The pre-cured polyimide belt was further cured at 320° C. for an additional hour under tension of 1 kilogram. A seamless polyimide belt was obtained with a smooth surface and a thickness of about 80 microns.

The other composition (Example 2) of polyamic acid of biphenyl tetracarboxylic dianhydride/4,4'-oxydianiline/ phosphate ester of alkylphenoxy polyethoxyethanol in a weight ratio of 99.1/0.9 was prepared in NMP, at about 18 weight percent solid, where the polyamic acid of biphenyl tetracarboxylic dianhydride/4,4'-oxydianiline was commercially available from UBE America Inc., New York, N.Y. with the trade name of U-VARNISH S (about 20 weight in NMP). The phosphate ester of alkylphenoxy polyethoxyethanol was commercially available from Stepan Company, Northfield, Ill. with the trade name of STEPFAC™ 8171 (nonylphenol ethoxylate phosphate with an average mole number of ethoxy (EO) of about 6). The clear coating solution was coated on a stainless steel belt, and subsequently cured at 125° C. for 30 minutes, 190° C. for 30 minutes and 320° C. for 60 minutes. The resulting polyimide film self released from the substrate, and an 80 µm smooth polyimide film was obtained.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled the in the art which are also encompassed by the following claims.

What is claimed is:

1. A method of forming a seamless belt suitable for use with an image forming system, comprising:
   flow coating a composition of a polyimide, a phosphate ester internal release agent, and a solvent onto and directly contacting an outer surface of a rotating substrate;
   partially curing the coating at a temperature of from about 125° C. to about 190° C. for a time of from about 30 to about 90 minutes to form a seamless belt;
   removing the partially cured belt by self-releasing the partially cured belt from the rotating substrate; and
   tensioning and rotating the partially cured belt between two rollers applying a tension of from about 1 kg to about 10 kg while fully curing the partially cured belt at a temperature of from about 250° C. to about 370° C. for a time of from about 30 to about 90 minutes.

2. The method of claim 1, wherein the composition further comprises a polysiloxane polymer selected from the group consisting of a polyester modified polydimethylsiloxane, a polyether modified polydimethylsiloxane, a polyacrylate modified polydimethylsiloxane, and a polyester polyether modified polydimethylsiloxane.

3. The method of claim 1, wherein the phosphate ester is selected from the group consisting of an alkyl alcohol ethoxylate phosphate, an alkyl phenol ethoxylate phosphate, an alkyl polyethoxyethanol phosphate, and an alkylphenoxy polyethoxyethanol phosphate, and said polyimide and said phosphate ester are present in a weight ratio of about 20/80 to about 80/20.

4. The method of claim 1, wherein the solvent is selected from the group consisting of tetrahydrofuran, methyl ethyl ketone, methyl isobutyl ketone, N,N'-dimethylformamide, N,N'-dimethylacetamide, N-methylpyrrolidone, and methylene chloride.

5. The method of claim 1, further comprising:
   coating an intermediate layer on an outer layer of the fully cured belt,
   wherein said intermediate layer comprises silicone.

6. The method of claim 5, further comprising:
coating a release layer on the intermediate layer,
wherein said release layer comprises fillers and a fluoropolymer.

7. The method of claim 6, wherein the fillers are selected from the group consisting of carbon blacks, carbon nanotubes, metal oxides, doped metal oxides, polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts, and mixtures thereof, and wherein the fluoropolymer comprises a fluoroelastomer or a fluoroplastic.

8. The method of claim 1, wherein the substrate comprises a metal belt, said belt possessing an $R_a$ of from about 0.01 micron to about 0.5 micron and an $R_{max}$ of from about 0.02 micron to about 4 microns.

9. A method of forming a seamless fuser member, comprising:
flow coating a composition of a polyimide, a phosphate ester internal release agent, a polysiloxane polymer, and a solvent onto and directly contacting an outer surface of a rotating substrate;
partially curing the coating at a temperature of from about 125° C. to about 190° C. for a time of from about 30 to about 90 minutes to form a seamless belt;
removing the partially cured belt by self-releasing the partially cured belt from the rotating substrate;
tensioning and rotating the partially cured belt between two rollers applying a tension of from about 1 kg to about 10 kg while fully curing the partially cured belt at a temperature of from about 250° C. to about 370° C. for a time of from about 30 to about 90 minutes;
coating an intermediate layer on an outer layer of the fully cured belt; and
coating a release layer on the intermediate layer.

10. The method of claim 9, wherein the solvent is selected from the group consisting of tetrahydrofuran, methyl ethyl ketone, methyl isobutyl ketone, N,N'-dimethylformamide, N,N'-dimethylacetamide, N-methylpyrrolidone, and methylene chloride.

11. The method of claim 9, wherein the polysiloxane polymer is selected from the group consisting of a polyester modified polydimethylsiloxane, a polyether modified polydimethylsiloxane, a polyacrylate modified polydimethylsiloxane, and a polyester polyether modified polydimethylsiloxane.

12. The method of claim 9, wherein the phosphate ester is selected from the group consisting of an alkyl alcohol ethoxylate phosphate, an alkyl phenol ethoxylate phosphate, an alkyl polyethoxyethanol phosphate, and an alkylphenoxy polyethoxyethanol phosphate.

* * * * *